US012414902B2

(12) United States Patent
Reed

(10) Patent No.: US 12,414,902 B2
(45) **Date of Patent: *Sep. 16, 2025**

(54) BOTTLE ASSEMBLY

(71) Applicant: Dr. Brown's Company, St. Louis, MO (US)

(72) Inventor: Mark D. Reed, Columbia, IL (US)

(73) Assignee: Dr. Brown's Company, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,118

(22) Filed: Jan. 10, 2024

(65) Prior Publication Data

US 2024/0139072 A1 May 2, 2024

Related U.S. Application Data

(60) Continuation of application No. 17/230,516, filed on Apr. 14, 2021, which is a division of application No.
(Continued)

(51) Int. Cl.
*A61J 9/04* (2006.01)
*A61J 9/00* (2006.01)
(Continued)

(52) U.S. Cl.
CPC . *A61J 9/04* (2013.01); *A61J 9/00* (2013.01); *A61J 9/006* (2013.01); *A61J 9/008* (2013.01);
(Continued)

(58) Field of Classification Search
CPC ........ B65D 41/04; B65D 41/0442; A61J 9/04; A61J 9/00; A61J 9/006; A61J 9/008;
(Continued)

(56) References Cited

U.S. PATENT DOCUMENTS 2,767,871 A 10/1956 Shapiro
2,822,102 A 2/1958 Holland
(Continued)

FOREIGN PATENT DOCUMENTS

CN 101156724 A 4/2008
CN 203970932 U 12/2014
(Continued)

OTHER PUBLICATIONS

Office Action for Brazil Patent Application No. BR112020015321-4 dated Oct. 1, 2023; 5 pp.

(Continued)

*Primary Examiner* — Don M Anderson
(74) *Attorney, Agent, or Firm* — Armstrong Teasdale LLP

(57) ABSTRACT

A bottle assembly includes a container, a collar assembly, and a vent insert. The collar assembly includes a collar and a nipple. The vent insert is configured for selective placement on an open top of the container. The vent insert, when placed on the open top of the container, defines a gap for allowing liquid in the liquid chamber of the container to flow towards the nipple and a vent passage having at least one vent opening in flow communication with the liquid chamber for allowing air to flow into the liquid chamber. The vent insert further defines an annular gap forming a portion of the vent passage. The bottle assembly is selectively operable in two different configurations, a first configuration in which the vent insert is placed on the open top of the container and a second configuration in which the vent insert is omitted.

22 Claims, 19 Drawing Sheets

Related U.S. Application Data

16/287,565, filed on Feb. 27, 2019, now Pat. No. 11,007,122.

(60) Provisional application No. 62/637,804, filed on Mar. 2, 2018.

(51) Int. Cl.
*A61J 9/08* (2006.01)
*A61J 11/02* (2006.01)
*A61J 11/00* (2006.01)

(52) U.S. Cl.
CPC ............... *A61J 9/085* (2013.01); *A61J 11/02* (2013.01); *A61J 11/008* (2013.01)

(58) Field of Classification Search
CPC . A61J 9/085; A61J 11/02; A61J 11/008; A61J 11/04
See application file for complete search history.

(56) References Cited

U.S. PATENT DOCUMENTS

| | | | | |
|---|---|---|---|---|
| 2,892,559 | A | 6/1959 | Raiche | |
| 3,362,556 | A | 1/1968 | Waldrum | |
| 3,411,648 | A | 11/1968 | Tichy | |
| 3,545,637 | A | 12/1970 | Barr | |
| 3,834,570 | A | 9/1974 | Barr | |
| 3,838,784 | A | 10/1974 | Barton | |
| 3,850,326 | A | 11/1974 | Ryles | |
| 4,279,353 | A | 7/1981 | Honma | |
| 4,386,696 | A | 6/1983 | Goncalves | |
| 5,078,287 | A | 1/1992 | Holmes, III | |
| 5,101,992 | A | 4/1992 | Serre | |
| 5,172,821 | A | 12/1992 | Knopf | |
| 5,244,105 | A | 9/1993 | Serre | |
| 5,316,160 | A | 5/1994 | Cautereels | |
| 5,779,071 | A | 7/1998 | Brown | |
| 5,791,503 | A | 8/1998 | Lyons | |
| 6,450,367 | B1 | 9/2002 | Sittler | |
| 6,543,632 | B1 | 4/2003 | McIntyre | |
| 6,702,134 | B2 | 3/2004 | Scalese | |
| 7,611,027 | B2 | 11/2009 | Kim | |
| 7,743,952 | B2 | 6/2010 | Auer | |
| 7,828,165 | B2 | 11/2010 | Brown | |
| 8,011,535 | B2 | 9/2011 | Tauber | |
| 8,113,365 | B2 | 2/2012 | Brown | |
| 8,146,759 | B2 | 4/2012 | Brown | |
| 8,579,132 | B2 | 11/2013 | Wong | |
| 8,640,902 | B2 | 2/2014 | Tirosh et al. | |
| 8,684,201 | B2 | 4/2014 | Berkovitch | |
| 9,566,214 | B2 | 2/2017 | Eitrheim | |
| 11,007,122 | B2 * | 5/2021 | Reed | A61J 9/04 |
| 2004/0089626 | A1 | 5/2004 | Pyun | |
| 2005/0051508 | A1 | 3/2005 | Hackmann | |
| 2005/0236353 | A1 | 10/2005 | Hsu | |
| 2005/0258124 | A1 | 11/2005 | Brown | |
| 2006/0124573 | A1 | 6/2006 | Nachumi | |
| 2006/0201902 | A1 | 9/2006 | Brown et al. | |
| 2006/0213859 | A1 | 9/2006 | Sheu | |
| 2006/0243694 | A1 | 11/2006 | McKendry | |
| 2007/0262041 | A1 | 11/2007 | Smith | |
| 2008/0099422 | A1 | 5/2008 | Rees | |
| 2008/0173612 | A1 | 7/2008 | Renz | |
| 2008/0202950 | A1 | 8/2008 | Anderson | |
| 2008/0302793 | A1 | 12/2008 | Tirosh | |
| 2009/0014403 | A1 | 1/2009 | Lu | |
| 2009/0071926 | A1 | 3/2009 | Berkovitch | |
| 2010/0072162 | A1 | 3/2010 | Park | |
| 2010/0181277 | A1 | 7/2010 | Brown et al. | |
| 2010/0230565 | A1 | 9/2010 | Walsh | |
| 2011/0000868 | A1 | 1/2011 | Brown | |
| 2011/0068078 | A1 | 3/2011 | Brown et al. | |
| 2011/0079570 | A1 | 4/2011 | Brown | |
| 2011/0297634 | A1 | 12/2011 | Diaz | |
| 2011/0309047 | A1 | 12/2011 | Fucito | |
| 2012/0085726 | A1 | 4/2012 | Lewis | |
| 2013/0048591 | A1 | 2/2013 | Morrone | |
| 2014/0130454 | A1 | 5/2014 | Kommer | |
| 2014/0190922 | A1 | 7/2014 | Rhodes et al. | |
| 2015/0014268 | A1 | 1/2015 | Rhodes et al. | |
| 2015/0055530 | A1 | 2/2015 | Yamauchi | |
| 2016/0089306 | A1 | 3/2016 | Chee | |
| 2016/0106628 | A1 * | 4/2016 | Kemper | A61J 11/02 215/44 |
| 2018/0042818 | A1 | 2/2018 | Reed et al. | |
| 2018/0104155 | A1 | 4/2018 | Reed | |

FOREIGN PATENT DOCUMENTS

| | | | |
|---|---|---|---|
| CN | 104940023 | A | 9/2015 |
| CN | 107088164 | A | 8/2017 |
| EP | 3746032 | B1 | 11/2021 |
| GB | 1070984 | A1 | 6/1967 |
| KR | 20170070139 | A | 6/2017 |
| RU | 2008100163 | A | 7/2009 |
| RU | 2009109244 | A | 9/2010 |
| RU | 2011147564 | A | 9/2013 |
| RU | 2012138699 | A | 3/2014 |
| WO | 2006048878 | A1 | 5/2006 |
| WO | 2011095971 | A1 | 8/2011 |
| WO | 2016061226 | A1 | 4/2016 |
| WO | 2018024272 | A2 | 2/2018 |

OTHER PUBLICATIONS

Office Action for Korean Patent Application No. 10-2020-7024911 dated Oct. 25, 2023; 5 pp.
Office Action for Mexican Patent Application MX/A/2020/009068 dated Dec. 12, 2023; 4 pp.
International Preliminary Report on Patentability for related application PCT/US2019/019757 mailed May 19, 2020; 17 pp.
PCT International Search Report and Written Opinion for related application PCT/US2019/019757 mailed May 7, 2019; 6 pp.
Office Action for Russian Patent Application 2420-564293RU dated Jul. 27, 2022; 7 pp.
Notification of First Office Action for China Patent Application 2019800161589 issued Sep. 9, 2022; 7 pp.
Office Action received for KR 10-2020-7024911 dated Nov. 7, 2023: 2pps.

* cited by examiner

BOTTLE ASSEMBLY

CROSS REFERENCE TO RELATED APPLICATIONS

This application is a continuation of U.S. patent application Ser. No. 17/230,516 filed Apr. 14, 2021, which is a divisional of U.S. patent application Ser. No. 16/287,565 filed Feb. 27, 2019 (now U.S. Pat. No. 11,007,122), which claims the benefit of U.S. Provisional Patent Application No. 62/637,804 filed Mar. 2, 2018, the disclosures of which are hereby incorporated by reference in their entirety.

FIELD

The field of this invention relates generally to bottle assemblies and more particularly to a bottle assembly including a container, a nipple, a collar for securing the nipple to the container, and a cap for covering the nipple when the container is not in use.

BACKGROUND

Bottle assemblies, such as infant or nursing bottle assemblies, typically have multiple components including a bottle, a nipple, a collar for securing the nipple to the bottle (the nipple and collar sometimes collectively defining a collar assembly), and a cap for covering the nipple when the bottle is not in use. The nipple typically has one or more openings for allowing liquid contained within the bottle to exit through the nipple and into an infant's mouth for consumption by the infant (or young child). During use, the infant places an end of the nipple in their mouth and sucks on the nipple to withdraw the liquid contained within the bottle.

Typical bottle assemblies require two hands to prepare the bottle for use and may be difficult to assemble. For example, the preparer may have to hold the bottle with one hand and remove the cap with the other hand to uncover the nipple. In addition, a user may have to grip and twist a collar to remove or secure the collar assembly on the container. However, the collar may be uncomfortable and/or difficult for the preparer to grip and twist. These issues may be exacerbated because the preparer may have limited use of their hands. For example, the preparer may be holding a distressed infant and be simultaneously attempting to prepare the bottle.

At least some bottle assemblies include a removable vent assembly that can be positioned within the bottle. Some examples of vented bottle assemblies include those available from Handi-Craft Company under the trade name Dr. Brown's. Additional examples are disclosed in U.S. Pat. No. 5,779,071 issued Jul. 14, 1998, U.S. Pat. No. 7,828,165 issued Nov. 9, 2010, U.S. Pat. No. 8,113,365 issued Feb. 14, 2012, and U.S. Pat. No. 8,146,759 issued Apr. 3, 2012, the disclosures of all of which are herein incorporated by reference in their entirety. In these bottle assemblies, the vent assembly allows air to enter the bottle while the infant consumes the liquid through the nipple, thus alleviating or reducing the formation of a vacuum within the bottle during nursing. The vent assembly typically seats, at least in part, on the rim of the bottle and a collar assembly including a collar and nipple are together threadably secured down over the vent assembly to external threads on the neck of the bottle. The vent assembly may vent the bottle to the atmosphere via a vent in the vent assembly that is located proximate the threads of the collar assembly. However, airflow into the vent could be inhibited by the amount of space available between the vent assembly and the collar assembly.

There is a need, therefore, for a bottle assembly that may be easily and quickly assembled even when a preparer has limited use of their hands. In addition, there is a need for a vent assembly that provides improved airflow into the bottle assembly during use and prevents leakage.

SUMMARY

In one aspect, a bottle assembly includes a container having an open end, a closed end, a base portion, and a neck together defining a liquid chamber within the container. The neck has a rim defining the open end of the container. The container has a central axis. The bottle assembly also includes a vent assembly positionable at least in part on the rim of the container to permit venting of the container during use. The vent assembly includes at least one lateral vent extending other than parallel to the central axis of the container when the vent assembly is positioned on the rim of the container. The vent assembly includes a vent insert including the at least one lateral vent and a perimeter wall. The perimeter wall defines at least one vent opening and at least partially defines an annular gap extending circumferentially around the vent insert. The at least one vent opening is in flow communication with the at least one lateral vent and the annular gap such that air is allowed to flow from the annular gap into the lateral vent through the vent opening. The bottle assembly further includes a collar assembly generally defining a closure for the container. The collar assembly is configured for releasable engagement with the neck of the container over the open end thereof to retain the vent assembly together with the container. The annular gap is defined between the collar assembly and the vent assembly.

In another aspect, a bottle assembly includes a container having an open end, a closed end, a base portion, and a neck together defining a liquid chamber within the container. The container has a central axis. The neck has a rim defining the open end of the container. The neck of the container includes external threads thereon. The bottle assembly also includes a collar assembly generally defining a closure for the container. The collar assembly is configured for releasable engagement with the neck of the container over the open end thereof. The collar assembly includes a collar and a nipple. The collar includes an outer surface, an internal surface, and internal threads for threaded engagement with the external threads of the neck of the container. The internal threads are disposed on the internal surface. The outer surface includes a plurality of elongate grooves extending along the central axis of the container when the collar is secured to the container. The elongate grooves are configured to provide a grip for a user to remove the collar assembly from the container.

In a further aspect, a bottle assembly includes a container having an open end, a closed end, a base portion, and a neck together defining a liquid chamber within the container. The neck has a rim defining the open end of the container. The bottle assembly also includes a collar assembly generally defining a closure for the container. The collar assembly is configured for releasable engagement with the neck of the container over the open end thereof. The collar assembly includes a collar and a nipple. The bottle assembly further includes a cap including a closed end, an open end, and a side wall extending between the closed end and the open end. The closed end, open end, and side wall together defining an interior and an exterior. The cap is configured for releasable engagement with the collar assembly such that the nipple is received within the interior of the cap. The side wall includes a curved surface defining a recess for removal of the cap from the collar assembly. The curved surface is concave relative to the exterior of the cap. The recess being closer to the cap closed end than to the cap open end.

In yet a further aspect, a bottle assembly includes a container having an open end, a closed end, a base portion, and a neck together defining a liquid chamber within the container. The neck has a rim defining the open end of the container. The container has a central axis. The bottle assembly also includes a vent assembly positionable at least in part on the rim of the container to permit venting of the container during use. The vent assembly includes a vent insert including an inner portion and an outer portion. The outer portion is configured to at least partially rest on the rim of the container. The inner portion includes an internal vent tube and a lip. The lip is cylindrical and extends along the central axis. The lip includes a plurality of bulges extending circumferentially around the lip. The vent assembly also includes a receptacle portion including a top and a tube. The top is configured to receive the lip of the vent insert. The plurality of bulges are configured to engage the top of the receptacle portion to form a seal between the vent insert and the top.

BRIEF DESCRIPTION OF THE DRAWINGS

Corresponding reference characters indicate corresponding parts throughout the several views of the drawings.

DETAILED DESCRIPTION OF THE DRAWINGS

Figure 1:
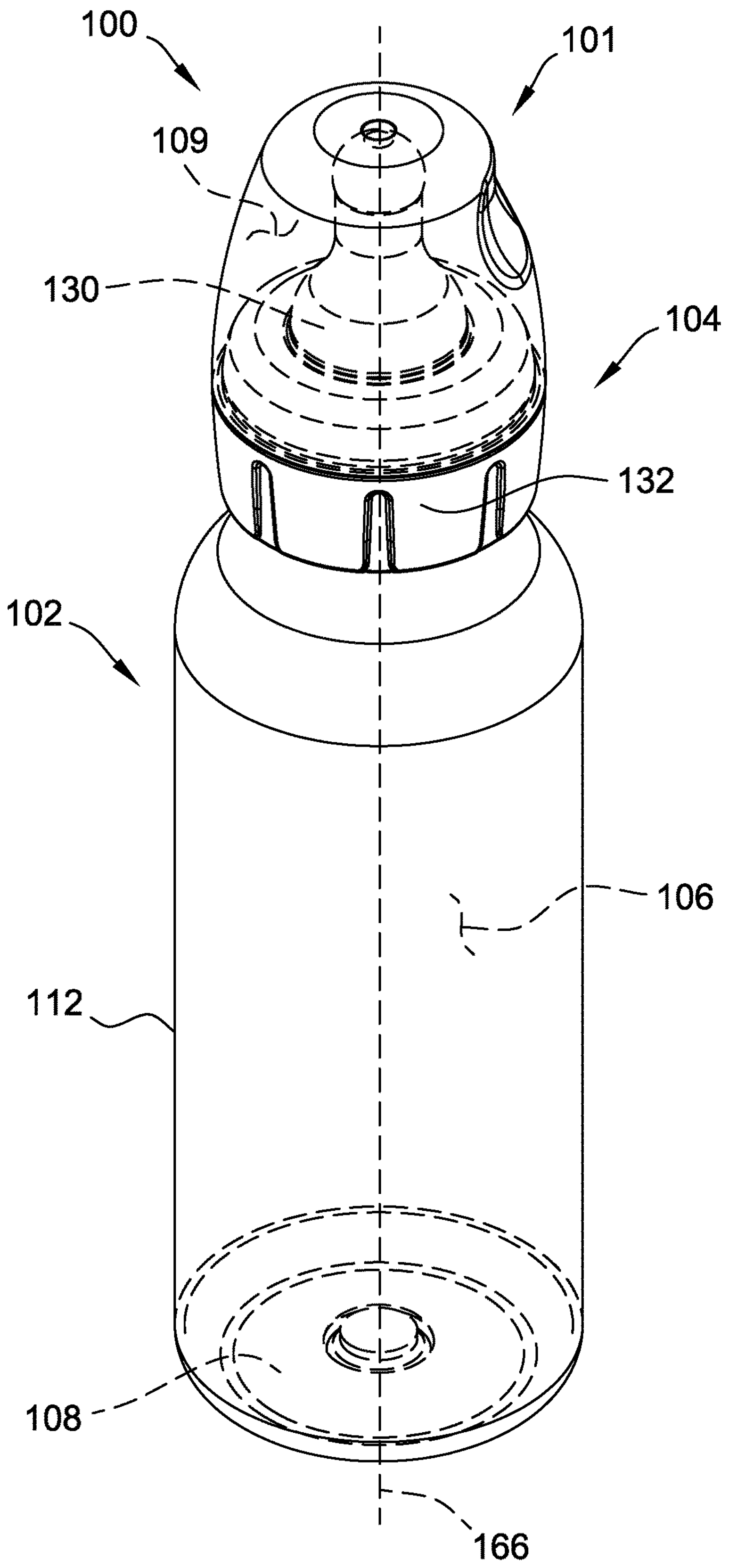
FIG. 1 is a perspective view of a nursing bottle assembly including a cap.
Figure 2:
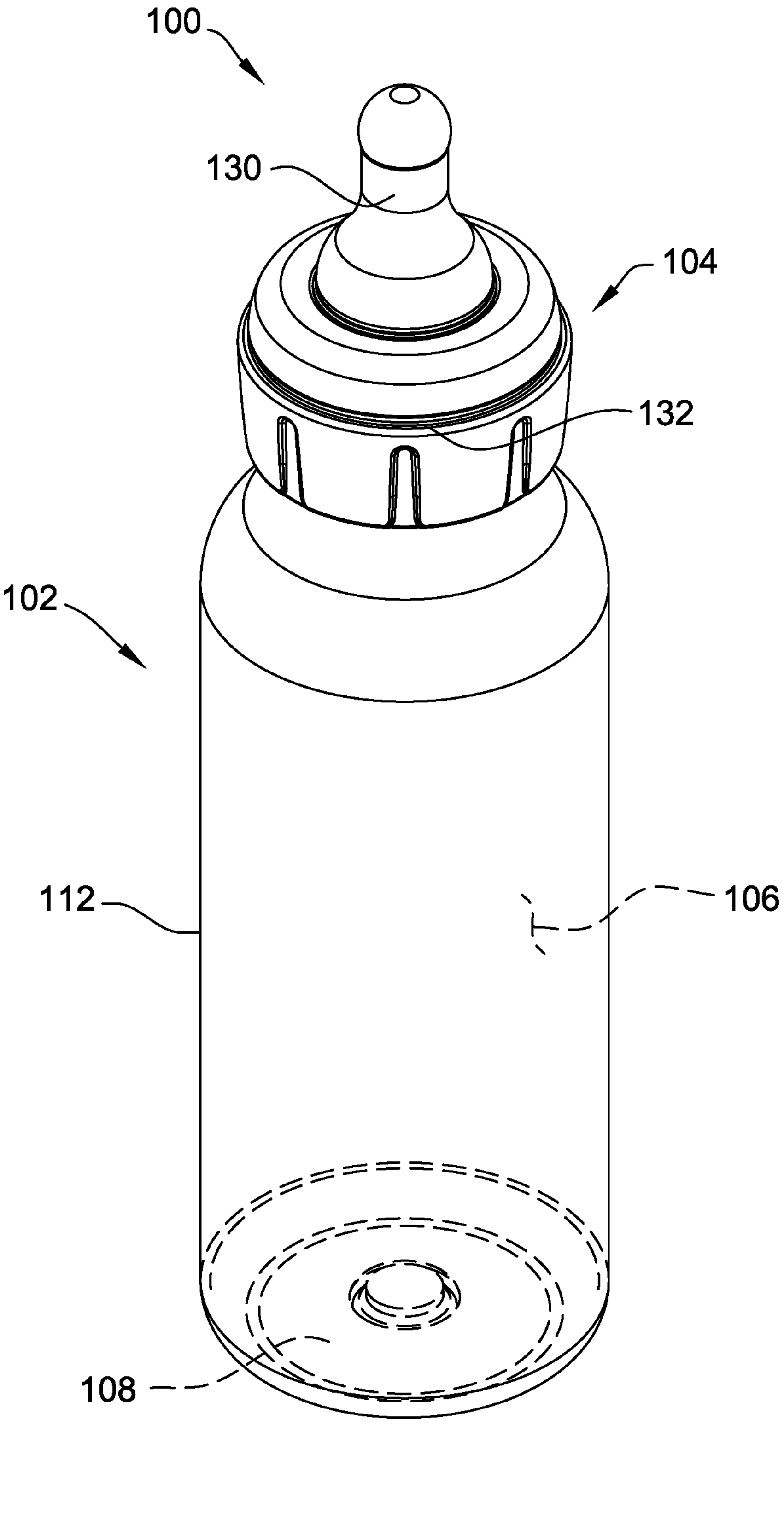
FIG. 2 is a perspective view of the nursing bottle assembly of FIG. 1 with the cap omitted.
Figure 3:
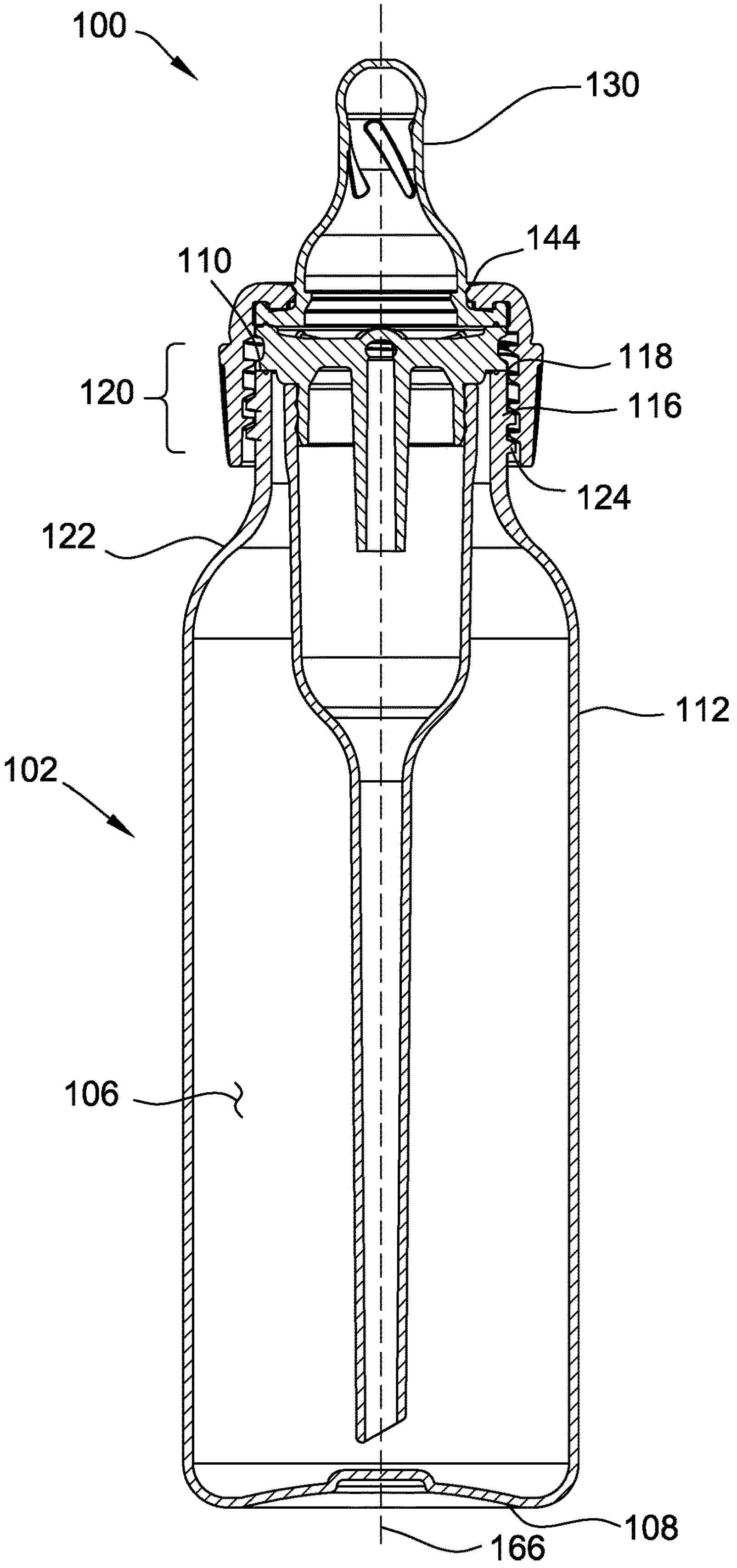
FIG. 3 is a cross-section of the bottle assembly of FIG. 2.

Referring now to the drawings and in particular to FIGS. 1-3, a bottle assembly, generally indicated at 100, includes a container 102 such as a bottle and more particularly a nursing bottle in the illustrated embodiment, and a collar assembly, generally indicated at 104 for generally closing the bottle. The container 102 includes a liquid chamber 106 defined therein and adapted to hold a quantity of liquid for consumption by a user, such as a nursing infant. It is also understood that the container 102 may be configured other than as illustrated herein, and may be configured for use other than as a nursing bottle assembly, such as a sports bottle, a drink tumbler, a training cup, a commuter cup, etc. The container 102 may be made of any suitable material such as, without limitation, glass, polypropylene or other plastic, aluminum, or stainless steel. The container 102 can also be made in any desired color or colors, and may be transparent, translucent, or opaque.

Figure 16:
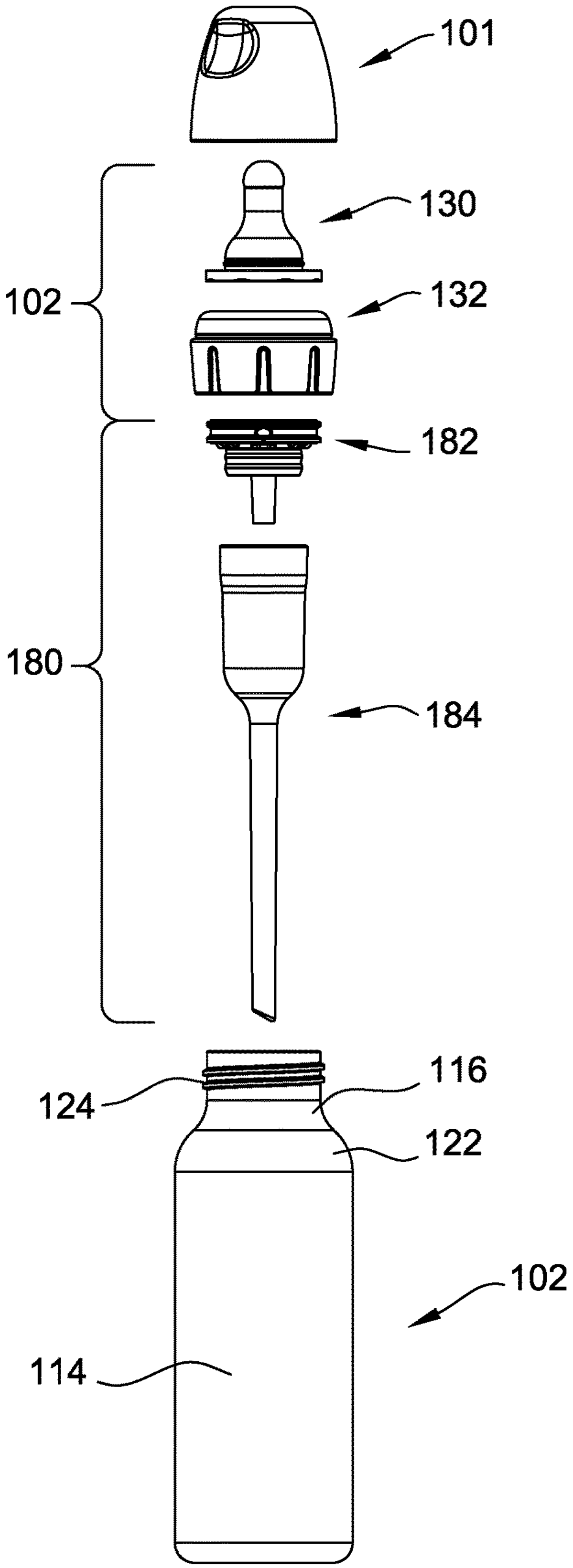
FIG. 16 is an exploded view of the bottle assembly of FIG. 1.
Figure 17:
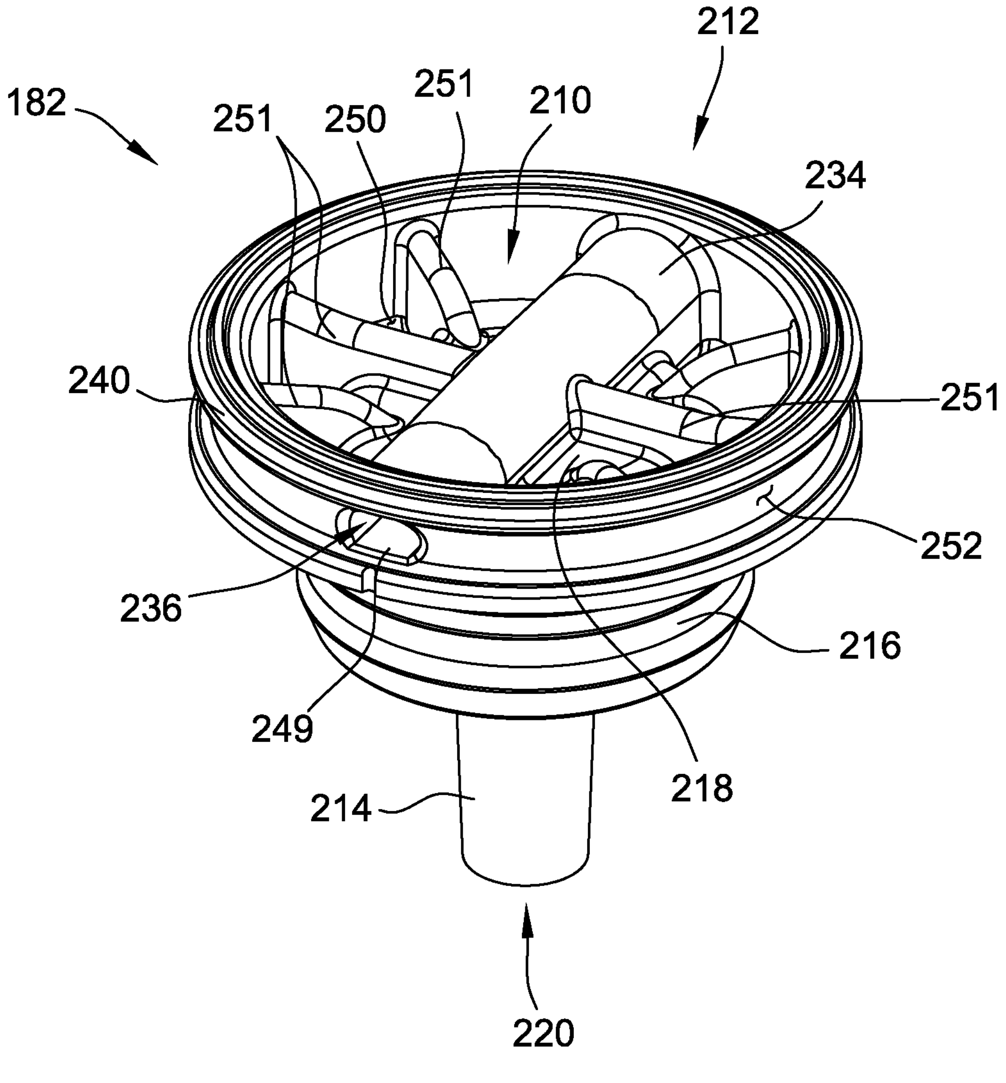
FIG. 17 is a perspective view of a vent insert of the bottle assembly of FIG. 1.
Figure 18:
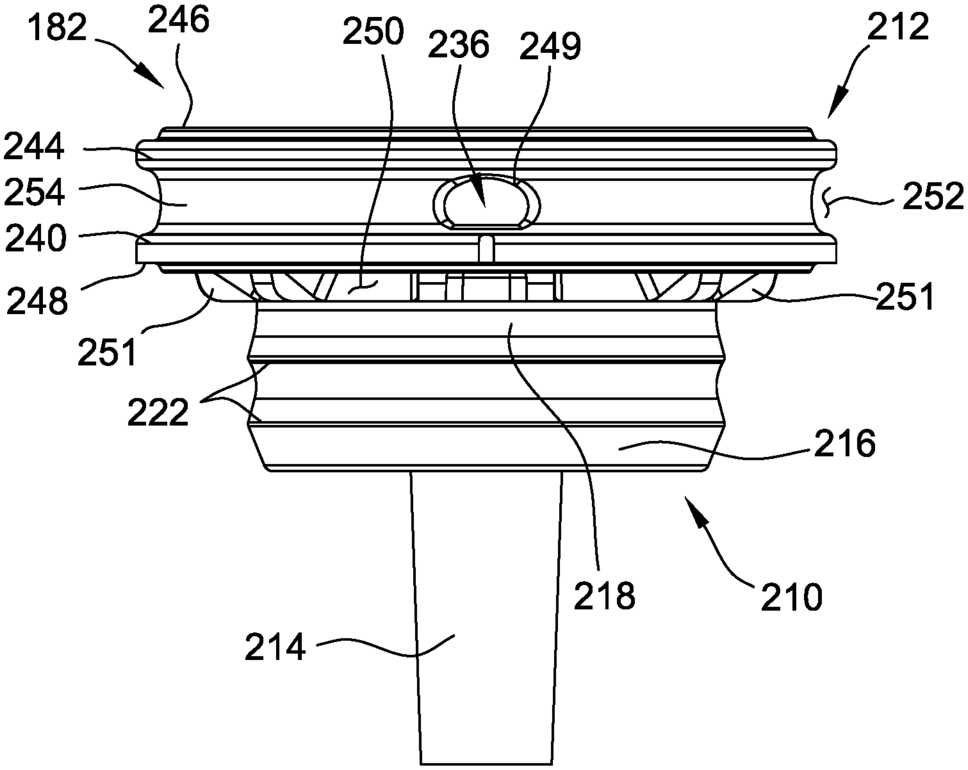
FIG. 18 is a side view of the vent insert of FIG. 17.
Figure 19:
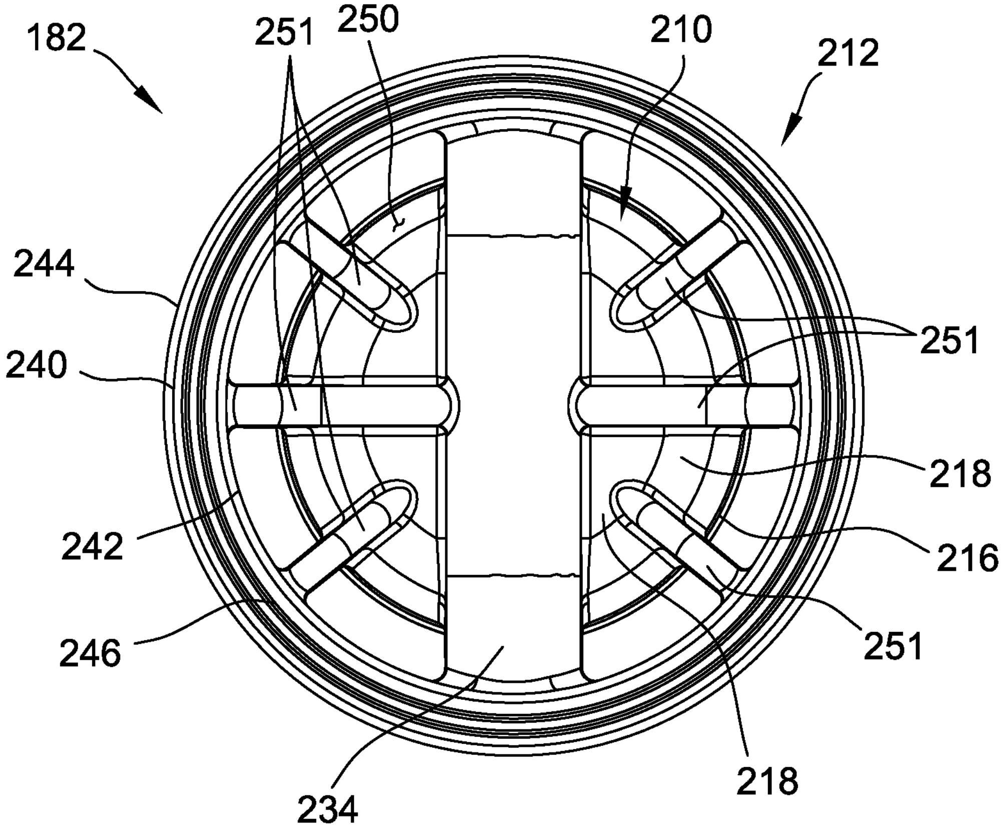
FIG. 19 is a top view of the vent insert of FIG. 17.
Figure 20:
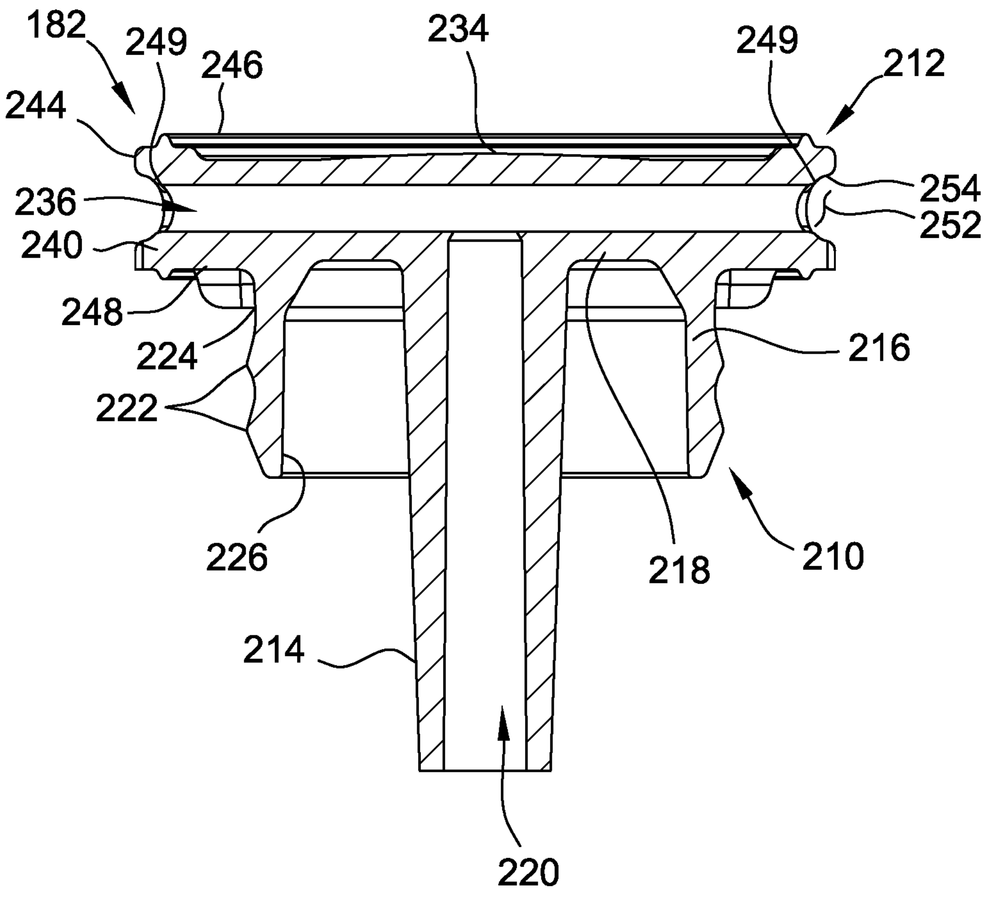
FIG. 20 is a cross-section of a portion of the vent insert illustrated in FIG. 18.
Figure 21:
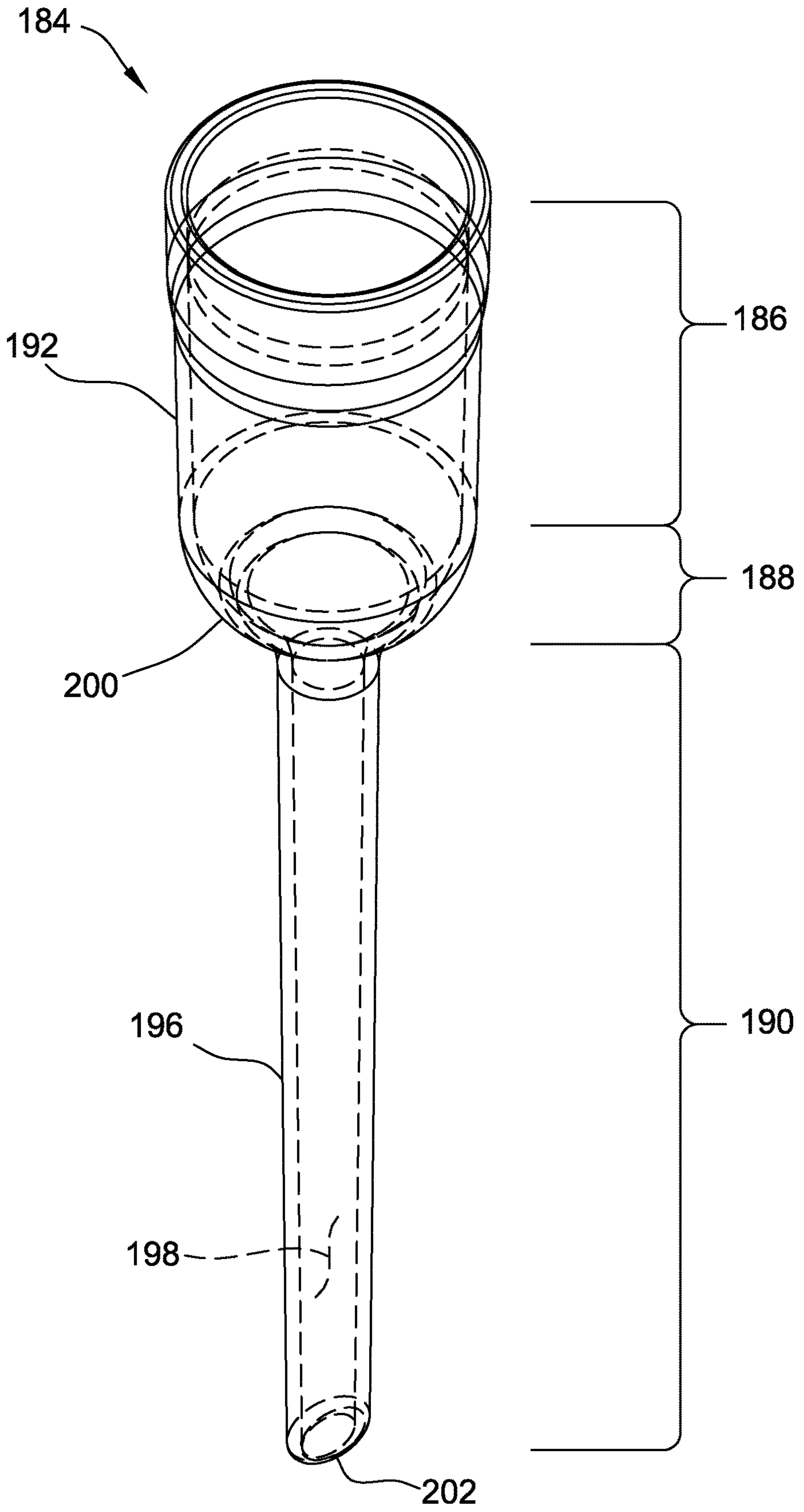
FIG. 21 is a perspective view of a vent tube of the bottle assembly shown in FIG. 1.

The container 102 has a closed bottom 108, an open top 110, and a generally cylindrical side wall 112 extending between the closed bottom 108 and the open top 110. The cylindrical side wall 112 includes a base portion 114 and a neck 116 that is narrowed with respect to the base portion 114. That is, the neck 116 has a smaller diameter than the base portion 114, as best seen in FIG. 16. It is understood that in other embodiments, the neck 116 diameter may only be slightly smaller than the diameter of the base portion 114, or even the same diameter as the base portion, without departing from the scope of this invention. The neck 116 includes an annular rim 118, an externally threaded portion 120, and a shoulder 122 defined at the transition between the neck 116 and the base portion 114. The threaded portion 120 includes threads 124 for assembling the container 102 to the collar assembly 104 as described later herein.

The collar assembly 104 of the bottle assembly 100 is adapted for removable attachment to the container 102 for selectively holding a nipple 130 on the container 102. The illustrated collar assembly 104 includes the nipple 130 and a collar 132. The nipple 130 and the collar 132 can each be made of any suitable material. In one embodiment, for example, the nipple 130 is made of a substantially pliable material such as at least one of a rubber material, a silicone material, and a latex material, and the collar 132 is made of polypropylene. The nipple 130 and the collar 132 can be made in any desired color or colors, and may be transparent, translucent, or opaque.

Figure 4:
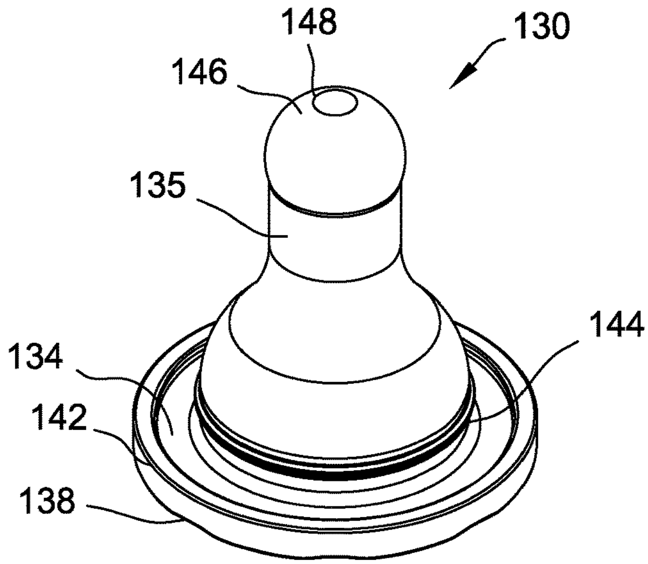
FIG. 4 is a perspective view of a nipple of the bottle assembly of FIG. 1.
Figure 5:
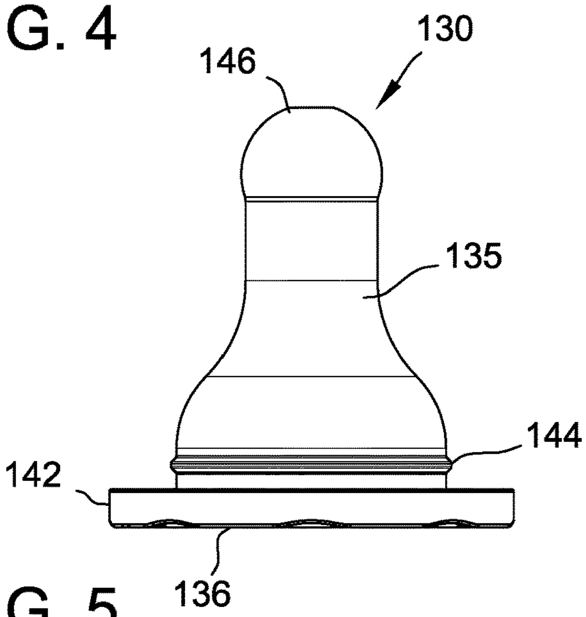
FIG. 5 is a side view of the nipple of FIG. 4.
Figure 6:
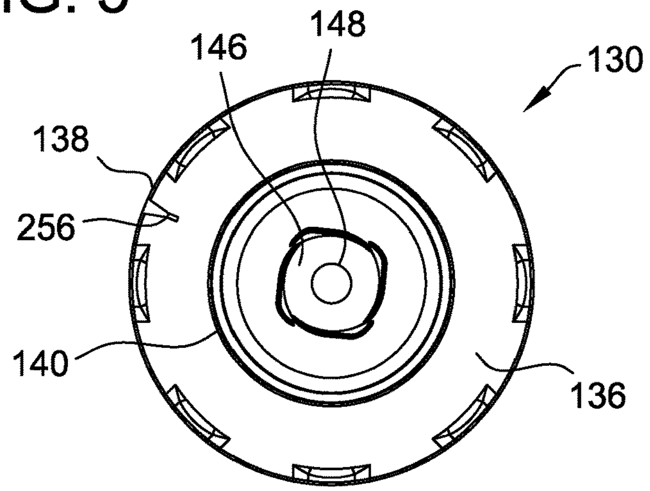
FIG. 6 is a bottom view of the nipple of FIG. 4.
Figure 7:
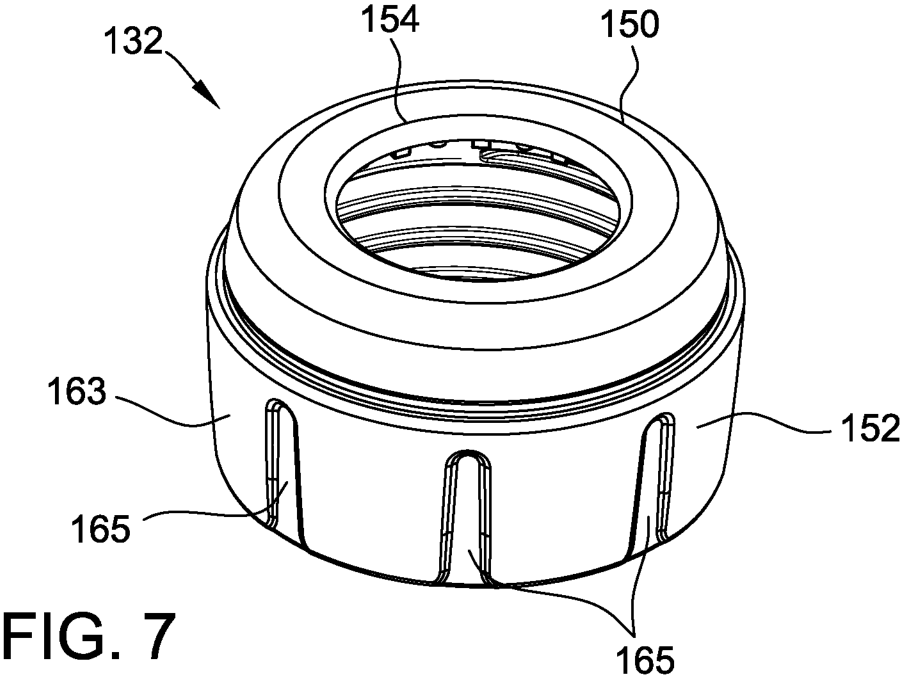
FIG. 7 is a perspective view of a collar of the bottle assembly of FIG. 1.

With reference to FIGS. 4-6, in the illustrated embodiment, the nipple 130 includes a nipple portion 135 and a transversely extending flange 134. The nipple flange 134 includes a bottom face 136 that extends from a generally circular outer edge 138 to a generally circular inner edge 140. In the illustrated embodiment, a peripherally extending lip 142 projects up from the flange generally adjacent the circular outer edge 138. In at least some alternative embodiments, the nipple 130 does not include a peripherally extending lip 142. The nipple portion 135 extends up from the flange 134 generally adjacent the circular inner edge 140 thereof. As illustrated in FIGS. 4 and 5, the nipple portion 135 includes an annular external projection 144 that projects radially outward. The nipple portion 135 also includes an outlet end 146 including an aperture 148 for dispensing liquid to the user. It is contemplated, however, that the nipple 130 can have different shapes and sizes than those illustrated and described herein without departing from the present invention.

As shown in FIGS. 7-12, the collar 132 has an annular top panel 150 and a depending side wall 152. The top panel 150 includes an annular projection 156 that extends downward from the underside of the panel proximate an annular nub or radially inner edge margin 154 of the top panel 150. The edge margin 154 and the annular projection 156 facilitate assembly of the nipple 130 on the collar 132. To assemble the collar assembly 104, the nipple 130 is pulled, nipple portion 135 first, up through the central opening in the top panel 150 of the collar 132 until the edge margin 154 is positioned below the annular external projection 144 of the nipple 130, and the annular projection 156 of the collar 132 is positioned radially inward of the peripheral lip 142 of the nipple 130. It is understood, however, that the nipple 130 and collar 132 may be configured other than as illustrated and still otherwise configured for assembly together for further assembly onto the container 102. It is also contemplated that in other embodiments the nipple 130 and collar 132 need not be capable of being held in assembly for conjoint assembly onto the container 102.

The side wall 152 of the collar 132 has an inner surface 162 with suitable internal threads 164 for threaded engagement with the external threads 124 of the neck 116 of the container 102 to releasably secure the collar and hence the collar assembly 104 on the container 102. In some embodiments, the number of threads 164 on the inner surface 162 of the collar side wall 152 exceeds the number of external threads 124 on the neck 116 of the container. In one embodiment, for example, the collar 132 may have approximately twice as many internal threads 164 as the number of external threads 124 on the neck 116 of the container 102.

Figure 8:
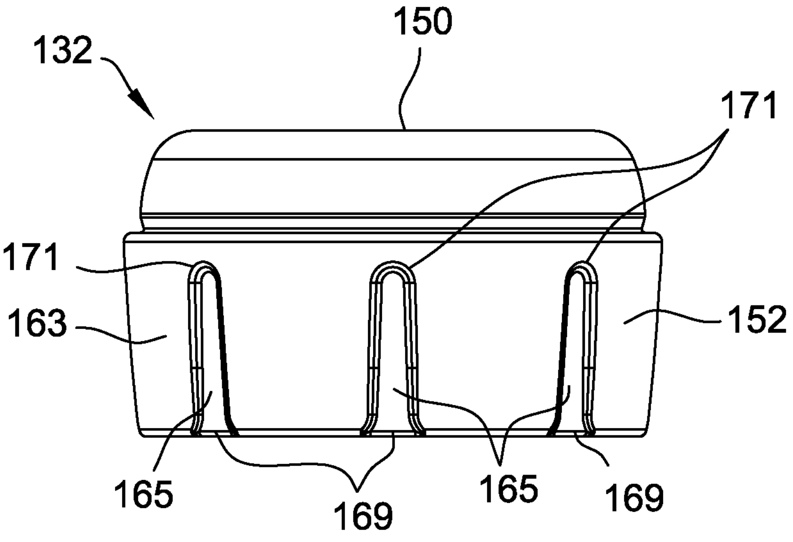
FIG. 8 is a side view of the collar of FIG. 7.
Figure 9:
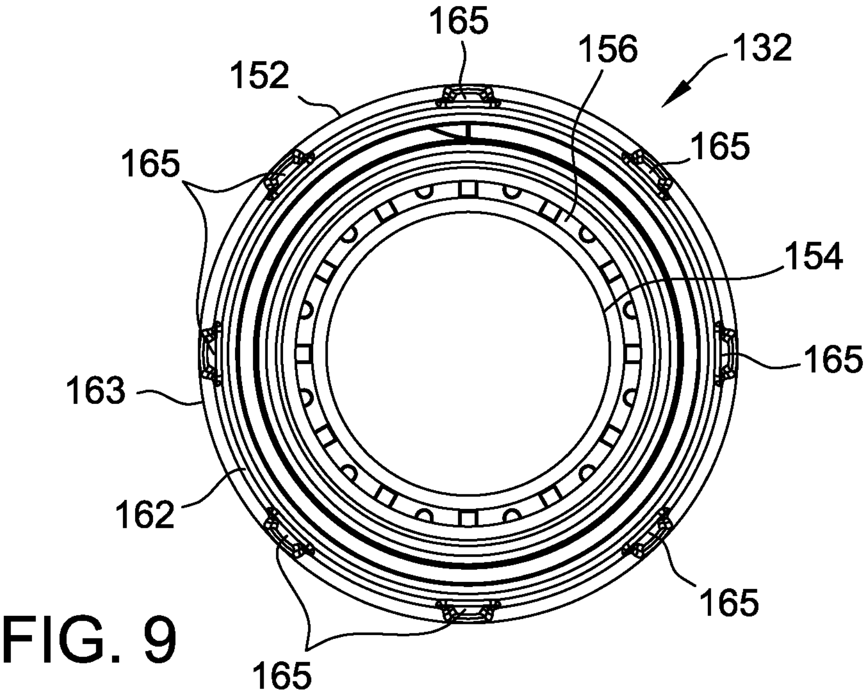
FIG. 9 is bottom view of the collar of FIG. 7.
Figure 10:
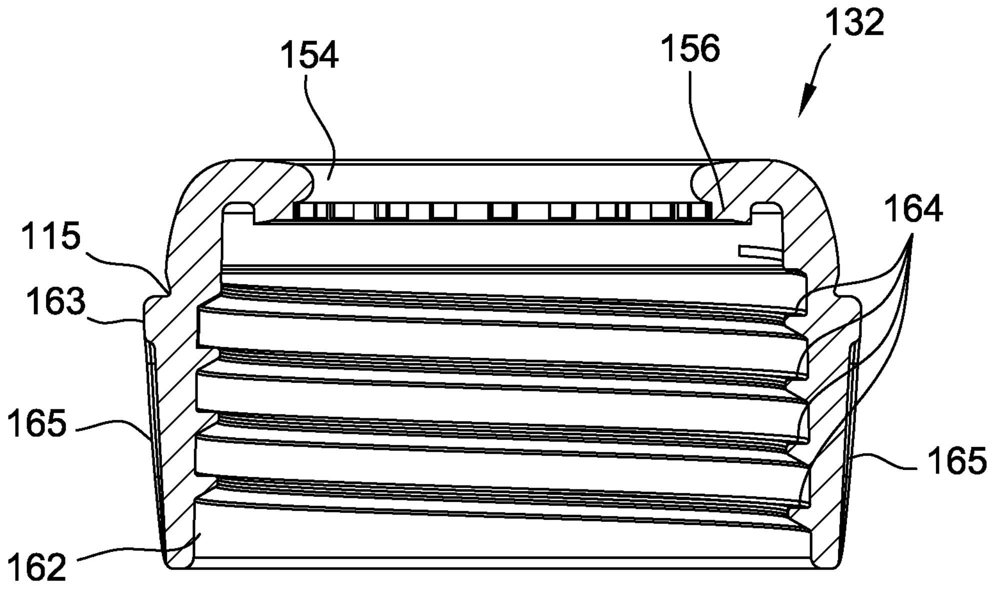
FIG. 10 is a cross-section of the collar illustrated in FIG. 8.

As best seen in FIGS. 8 and 10, the side wall 152 of the collar 132 has an outer surface 163 opposite the inner surface 162. The outer surface 163 includes a plurality of grooves 165. The grooves 165 are elongate, i.e., have a length that is greater than their width, and extend along a central axis 166 of the container 102 (shown in FIG. 1) when the collar 132 is secured to the container. Accordingly, the grooves 165 are substantially perpendicular to the internal threads 164. The grooves 165 are equally spaced circumferentially about the collar 132. In the illustrated embodiment, the collar 132 includes eight grooves 165. In other embodiments, the collar 132 may include any suitable grooves 165 without departing from some aspects of the disclosure.

The grooves 165 help a preparer to grasp and rotate the collar 132 to adjust the threaded engagement of the container 102 and the collar and secure or remove the collar from the container. Specifically, the grooves 165 are configured to receive portions of a hand or other object used to grip the collar 132. The grooves 165 increase the contact area between the object and the collar 132 and resist slippage of the object relative to the collar. Accordingly, the grooves 165 may provide an improved grip in comparison to at least some known collars. In addition, the user may feel less discomfort when gripping the collar 132 in comparison to at least some known collars because the collar includes grooves 165 and does not include projections or other grip structures which may cause high stress points on the gripping object.

In the illustrated embodiment, each groove 165 extends from a bottom of the side wall 152 to beyond the midpoint of the side wall. Each groove 165 includes a first end 169 at the bottom of the collar 132 and a second end 171 defined by the side wall 152 at a point between the bottom and top of the collar. The second end 171 is at least partially rounded. The first end 169 is open and defines a maximum width of each groove 165. The width of each groove 165 decreases from the first end 169 to the second end 171. Accordingly, the second end 171 defines a minimum width of each groove 165. In other embodiments, the grooves 165 may be any shape that enable the grooves to function as described herein. In some embodiments, the grooves 165 may be different shapes.

As seen in FIGS. 1 and 13-16, the bottle assembly 100 also includes a cap 101 for covering the nipple 130 when the bottle assembly 100 is not in use. The cap 101 includes an open end 103, a closed end 105, and a side wall 107 extending between the open end 103 and the closed end 105. The side wall 107 and the closed end 105 define an interior space 109 sized and shaped to receive the nipple 130 therein. In the illustrated embodiment, the cap 101 is a dome. Specifically, the side wall 107 generally curves along the extension between the open end 103 and the closed end 105 such that the open end 103 has a greater diameter than the closed end 105. Accordingly, the side wall 107 has a generally convex curve when viewed from the exterior of the cap 101. In other embodiments, the cap 101 may have any shape that enables the cap 101 to function as described.

The cap 101 may be positioned on the collar assembly 104 such that at least a portion of the collar assembly extends through the open end 103 and into the interior space 109. Specifically, the nipple 130 is arranged to extend into the interior space 109 when the cap 101 is positioned on the collar assembly 104. A plurality of projections 111 extend downward from the center of the closed end 105 to engage the nipple 130 and inhibit displacement of the nipple when the cap 101 covers the nipple. In addition, the side wall 107 of the cap 101 includes latches 113 extending along the open end 103 that engage the collar 132. The latches 113 extend radially inward from an inner surface of the side wall 107 and are sized to extend into an annular groove 115 (shown in FIG. 10) along the base of the annular top panel 150 of the collar 132. Accordingly, when the cap 101 is positioned on the collar assembly 104, the edge 117 of the side wall 107 rests on the top of the side wall 152 and the latches 113 engage the collar 132.

In the illustrated embodiment, the cap 101 and the collar 132 are configured for a releasable snap-fit engagement. Specifically, to secure the cap 101 to the collar assembly 104, the preparer positions the cap 101 on the collar assembly 104 and presses in a direction toward the collar 132. Due to the pressing force, the cap 101 deforms slightly and allows the latches 113 to engage the collar 132. To remove the cap 101 from the collar assembly 104, the preparer presses or pulls the cap 101 away from the collar assembly 104 and the latches 113 disengage from the collar 132. In other embodiments, the cap 101 may be secured to the collar 132 in any manner that enables the bottle assembly 100 to function as described herein.

The cap 101 further includes a recess 119 defined by the side wall 107 and arranged for a preparer to grip the cap 101 and position the cap 101 relative to the collar assembly 104. In the illustrated embodiment, the side wall 107 includes a curved surface 121 defining the recess 119. The curved surface 121 has a radius of curvature that is different from the radius of curvature of the rest of the side wall 107.

Specifically, the curved surface 121 curves inward from the side wall 107 such that the recess 119 is concave relative to the exterior of the cap 101. The recess 119 is sized and shaped to receive a thumb or other finger. For example, in the illustrated embodiment, the curved surface 121 include a perimeter edge 123 that defines an oval shape. In addition, the recess 119 is spaced from the open end 103 a distance that corresponds to an average finger length and is closer to the closed end 105 than to the open 103. The distance between the open end 103 and the recess 119 allows a finger of a hand to be positioned in the recess while the same hand grasps the collar 132 when the cap 101 is secured to the collar assembly 104. As a result, the recess 119 enables a person to remove the cap 101 from the collar assembly 104 using one hand. For example, the person may grasp the collar 132 of the bottle assembly 100 with one hand and press on the cap 101 with a finger of the hand positioned in the recess 119 to remove the cap 101 with a single hand.

Suitably, the recess 119 is shaped and positioned to utilize the leverage of a person's finger and allow for easier positioning of the cap 101 relative to the collar assembly 104. For example, the perimeter of the recess 119 includes two parallel circumferentially extending portions 126 connected by two axially extending arcs 128. The parallel portions define outer edges of a middle portion of the recess 119 that is substantially U-shaped. The two arcs define outer edges of side portions which are partial bowl shapes. Accordingly, the recess 119 has an overall stadium shape, i.e., a rectangle with semicircles at opposite ends. The recess 119 is shaped for a user to apply a force at substantially a center of the recess 119. In addition, the center of the recess 119 is closer to the closed end 105 than the open end 103. Accordingly, when a finger is positioned in the recess and a force applied to the recess 119, a moment equal to the distance between the center of the recess 119 and a pivot point is generated at the center of the recess 119 that facilitates removal of the cap. In the illustrated embodiment, substantially the entire recess 119 is located above a midplane of the cap 101.

With reference to FIGS. 16-21, the bottle assembly 100 also includes a vent assembly 180 to permit venting of the bottle assembly during use. The vent assembly 180 includes a vent insert 182 and a receptacle portion 184. The receptacle portion 184 is releasably attachable to the vent insert 182. The receptacle portion 184 includes a top 186, a middle portion 188, and a vent tube 190. The top 186 includes a generally cylindrical side wall 192 that defines a reservoir 194 therein. The vent tube 190 includes a generally cylindrical side wall 196 that has a smaller diameter than the side wall 192 of the top 186. The side wall 196 of the vent tube 190 defines a passage 198 that is in fluid communication with the reservoir 194. The middle portion 188 includes a tapered side wall 200 that extends between the vent tube side wall 196 and the top side wall 192. The vent tube 190 also includes an air outlet 202 at an end of the passage 198 proximate the closed bottom 108 of the container 102.

The vent insert 182 includes an inner portion 210 and an outer portion 212. The inner portion 210 includes an internal vent tube 214, a lip 216, and a top wall 218 extending between and oriented orthogonal to the internal vent tube 214 and lip 216. The internal vent tube 214 defines a passage 220 in flow communication with the reservoir 194. The inner portion 210 of the vent insert 182 further includes a lateral vent 234 extending upward from the top wall 218 to define a channel 236 within the vent insert 182. The outer portion 212 of the vent insert 182 includes a perimeter wall 240. A gap 250 defined between the perimeter wall 240 and the top wall 218 enables liquid in the liquid chamber 106 to flow towards the nipple 130. A plurality of ribs 251 extend across the gap 250 and connect the perimeter wall 240 to the top wall 218. The lateral vent 234 extends to the perimeter wall 240 which has at least one vent opening 249 that allows the channel 236 to extend through the perimeter wall 240. As best in FIG. 20, in the illustrated embodiment, the lateral vent 234 extends across the entire diameter of the vent insert 182 and is in flow communication with two vent openings 249 defined by the perimeter wall 240 on opposite ends of the lateral vent 234.

The perimeter wall 240 includes an inner edge 242, an outer edge 244, a top 246, and a bottom 248. The perimeter wall 240 also defines an annular gap 252 extending circumferentially around the vent insert 182 and in flow communication with the channel 236 via the vent openings 249. Specifically, a curved surface 254 extends radially inward from the outer edge 244 towards the inner edge 242 to define the annular gap 252. The curved surface 254 is concave relative to the outer edge 244 and is disposed between the top 246 and the bottom 248. Accordingly, the thickness of the perimeter wall 240 defined between the outer edge 244 and the inner edge 242 is greater than the thickness of the perimeter wall 240 defined between the curved surface 254 and the inner edge 242. Accordingly, the annular gap 252 provides increased space between the vent insert 182 and the collar assembly 104 to allow air flow 253 (shown in FIG. 23) into the channel 236 from the atmosphere through the collar assembly.

Figure 22:
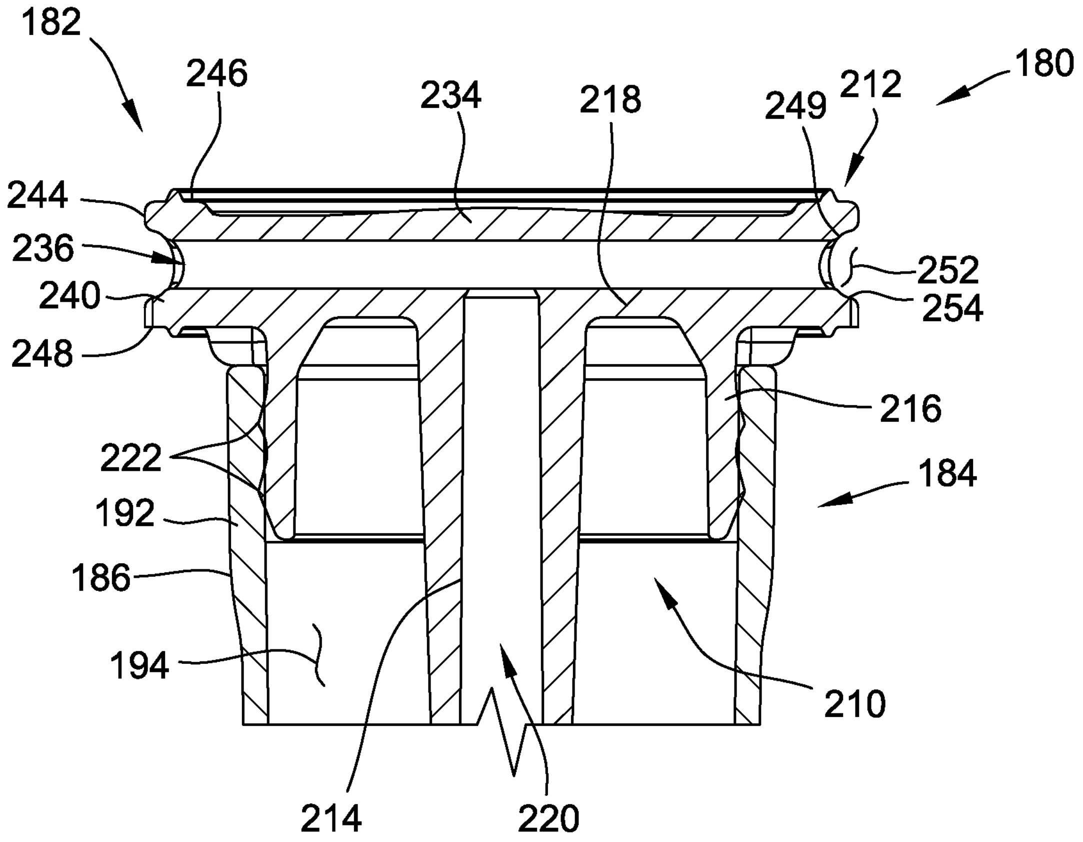
FIG. 22 is a cross-section of a portion of a vent assembly including the vent insert of FIG. 17 and the vent tube of FIG. 21.

With reference to FIG. 22, to assemble the vent insert 182 to the receptacle portion 184, the lip 216 is inserted into the top 186 of the receptacle portion 184 such that the side wall 192 contacts the lip 216. The lip 216 is configured to engage the side wall 192 of the receptacle portion 184. For example, the lip 216 includes a plurality of annular ribs or bulges 222 that engage the side wall 192. In the illustrated embodiment, the lip 216 is cylindrical and extends along the central axis 166 of the bottle assembly 100 (shown in FIG. 3). The bulges 222 extend circumferentially around the lip 216. The bulges 222 are spaced axially apart along the lip 216. The bulges 222 are continuous and provide a seal between the lip 216 and the side wall 192. Moreover, the seal between the lip 216 and the side wall 192 is improved because the lip 216 includes two or more bulges 222. In addition, the bulges 222 extend radially outward from an outer surface of the lip 216 to engage the side wall 192 when the lip is inserted into the receptacle portion. In other embodiments, the vent insert 182 may engage the receptacle portion 184 in any manner that enables the vent assembly 180 to function as described herein. For example, the bulges 222 may extend from an inner surface of the lip 216 and the receptacle portion 184 may be inserted in the lip 216. In some embodiments, the receptacle portion 184 may include bulges 222 that engage the vent insert 182. Alternatively, the vent insert 182 and the receptacle portion 184 may be integrally formed with each other.

The lip 216 includes an outer surface 224 and an inner surface 226 opposite the outer surface 224. The inner surface 226 is substantially smooth and defines a cylindrical bore through the lip 216. A thickness of the lip 216 is defined between the inner surface 226 and the outer surface 224. Each bulge 222 has a triangular cross-section and includes two equal sloped sides extending outward from the lip 216 and connecting at a peak. Accordingly, the lip 216 has a maximum thickness at the peaks of the bulges 222.

The bulges 222 are positioned to engage a portion of the side wall 192 spaced from the edge of the side wall 192 when the vent insert 182 and the receptacle portion 184 are assembled. A lowermost one of the bulges 222 is positioned at an edge of the lip 216. The upper bulge 222 is positioned end to end with the lower bulge 222 and is spaced from the edge of the lip 216 by the width of the lower bulge 222. The crests or peaks of the bulges 222 are spaced apart by a distance equal to or less than the width of one bulge 222. In the illustrated embodiment, the lip 216 includes two bulges 222 that cover a majority, i.e., greater than 50%, of the outer surface 224 of the lip 216 and the lip 216 is free of any additional bulges or sealing features.

It is contemplated, however, that the components of the vent assembly 180 can have different shapes and sizes than those illustrated and described herein without departing from some aspects of this invention. Similar vent assemblies are known in the art, such as those used on the bottle assemblies disclosed in U.S. Pat. No. 5,779,071 issued Jul. 14, 1998, U.S. Pat. No. 7,828,165 issued Nov. 9, 2010, U.S. Pat. No. 8,113,365 issued Feb. 14, 2012, and U.S. Pat. No. 8,146,759 issued Apr. 3, 2012.

Figure 11:
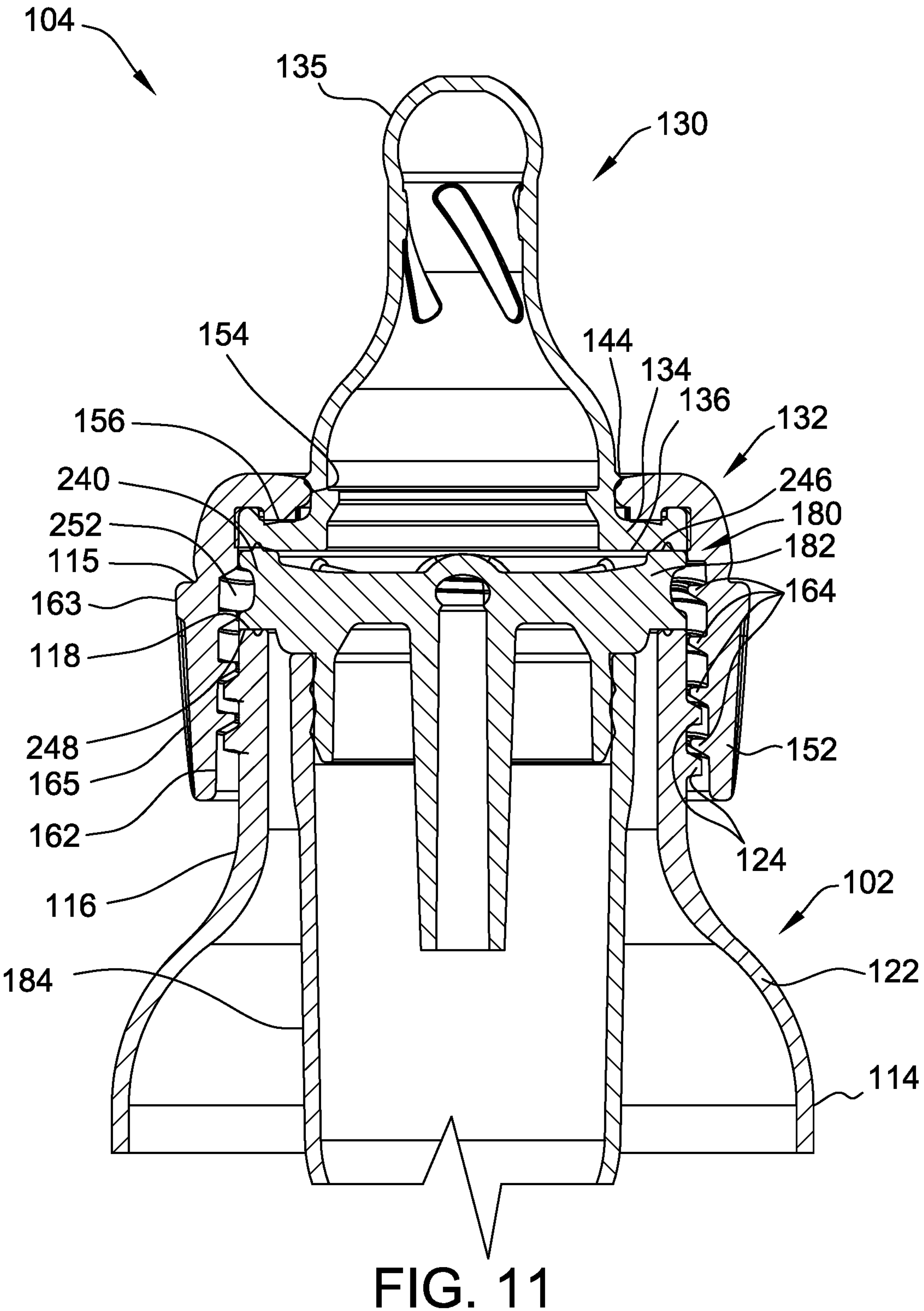
FIG. 11 is an enlarged cross-section of a portion of the bottle assembly of FIG. 1 with the vent assembly included.
Figure 12:
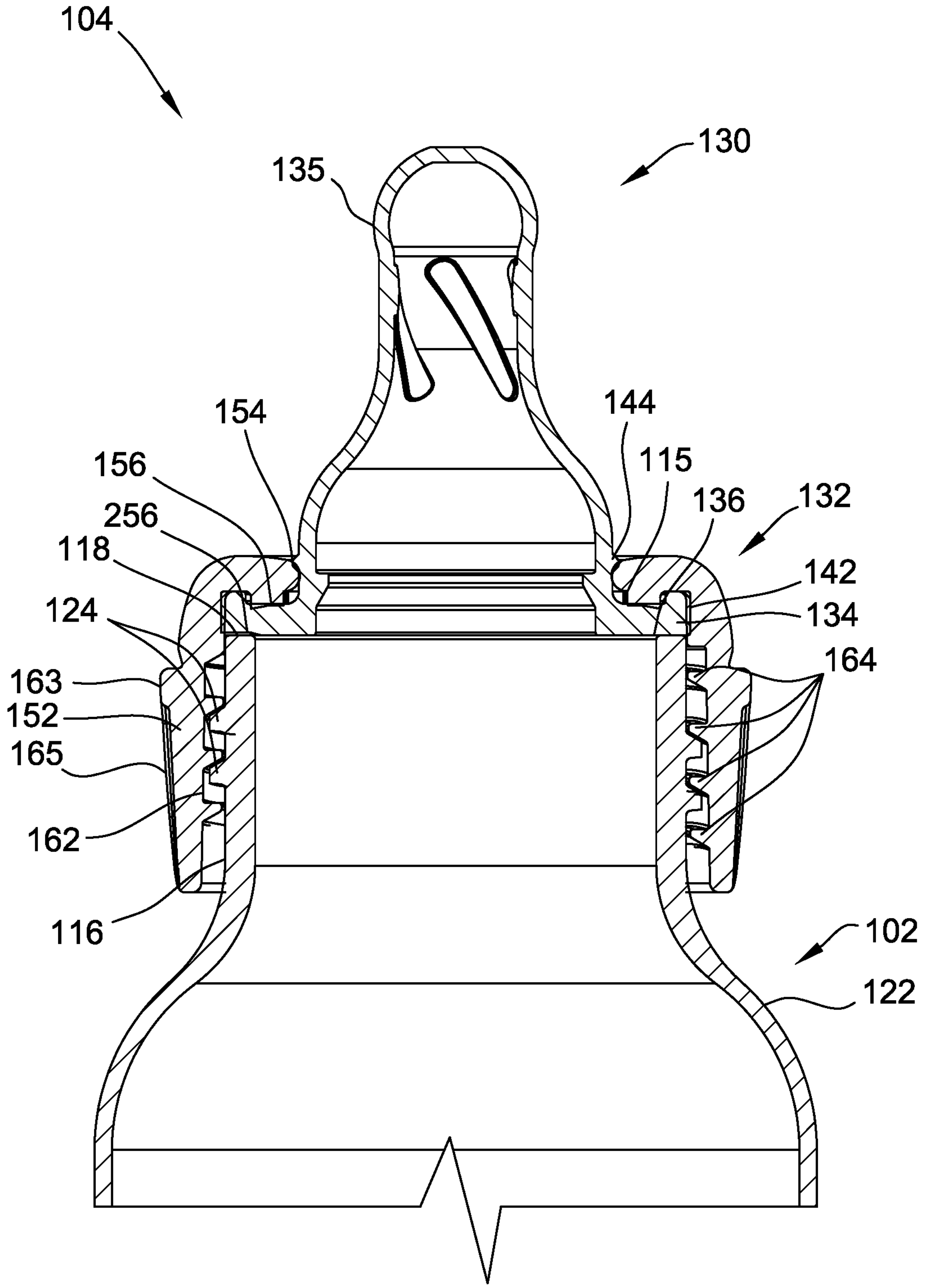
FIG. 12 is an enlarged cross-section of a portion of the bottle assembly of FIG. 1 with the vent assembly omitted.
Figure 13:
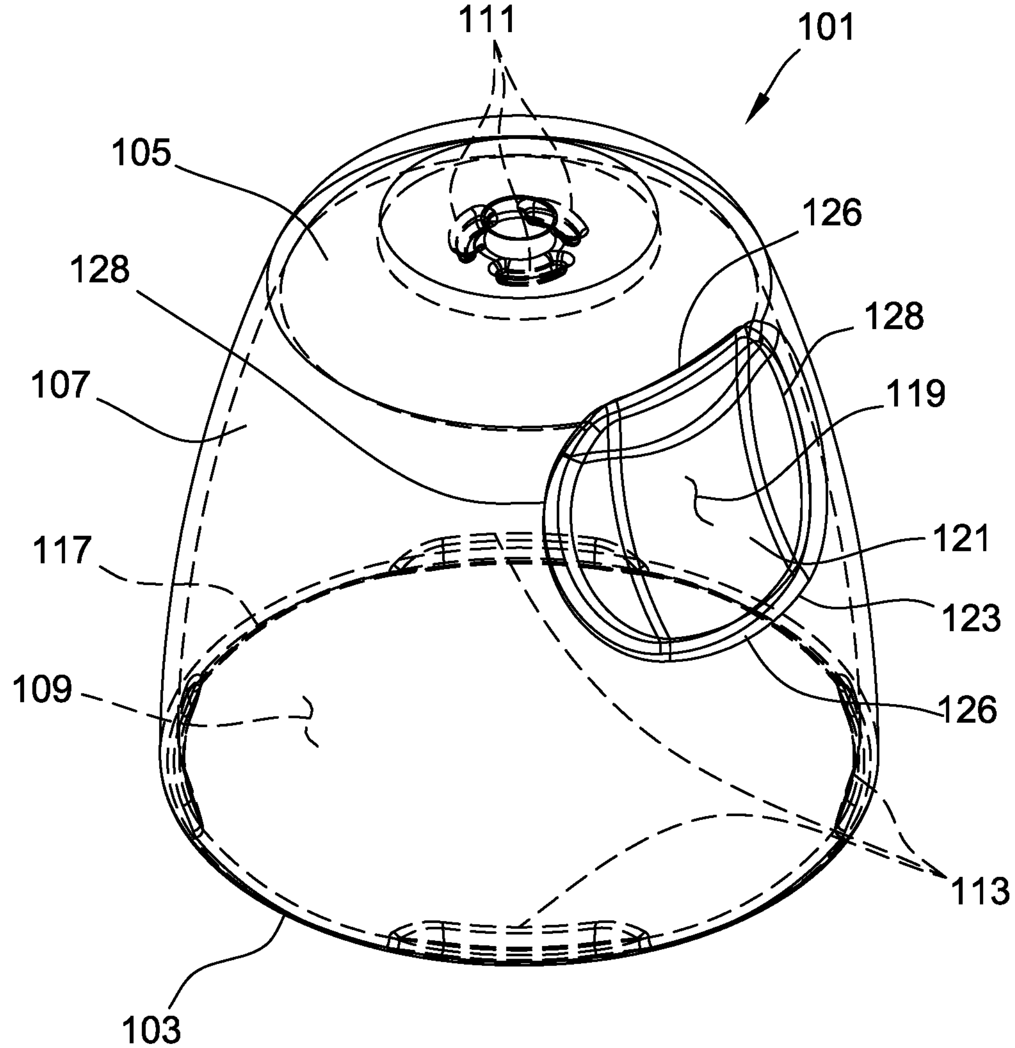
FIG. 13 is a perspective view of the cap of the bottle assembly of FIG. 1.
Figure 14:
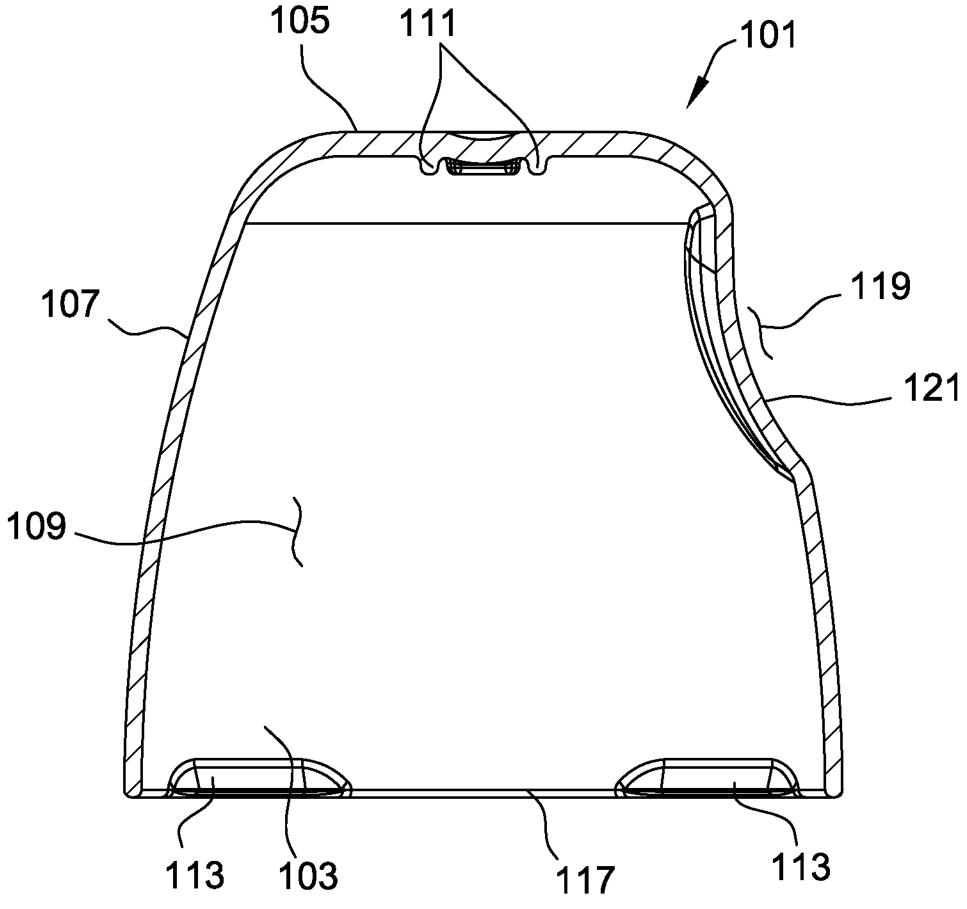
FIG. 14 is a cross-section of the cap of FIG. 13.
Figure 15:
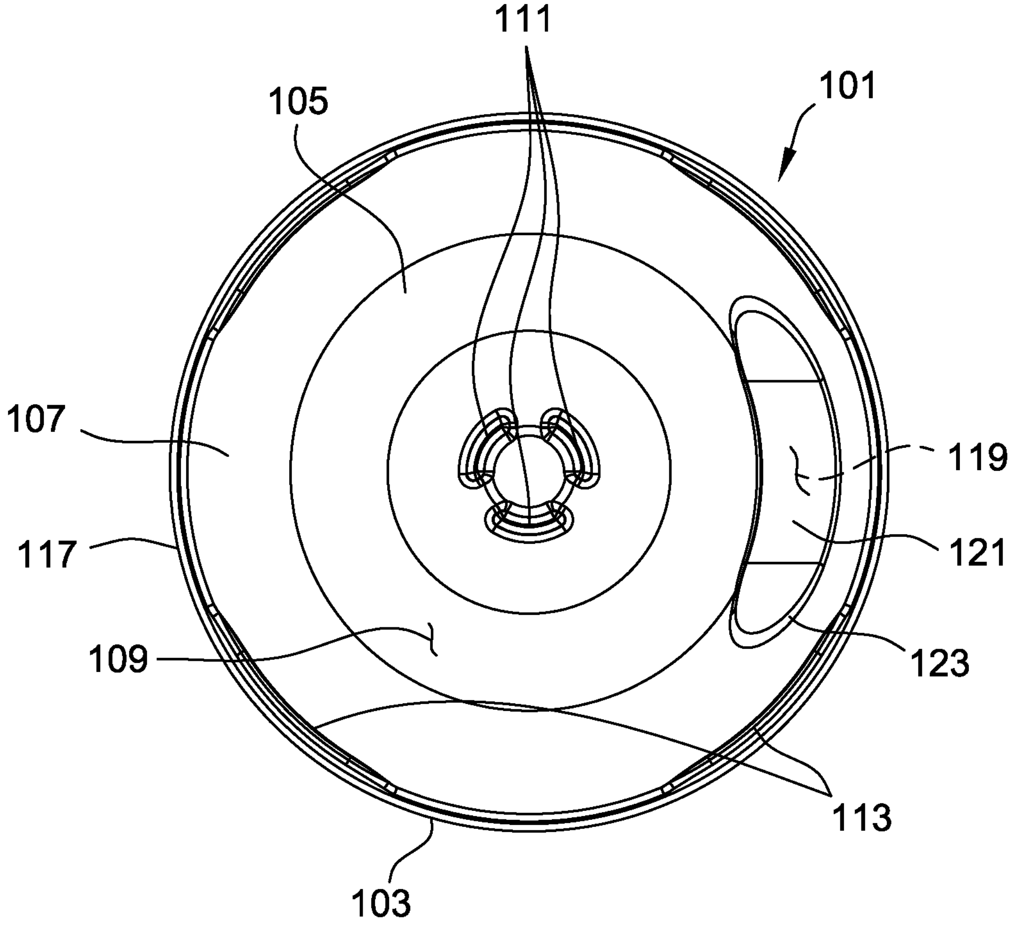
FIG. 15 is a bottom view of the cap of FIG. 13.

As illustrated in FIGS. 11 and 12, the collar side wall 152 and the container neck 116 are suitably sized relative to each other to permit operation of the bottle assembly 100 in two different configurations, a first configuration (FIG. 11) in which the vent assembly 180 is included and a second configuration (FIG. 12) in which the vent assembly is omitted. For example, in the illustrated embodiment, the length (or height in the orientation of the drawings herein) of the container neck 116 (e.g., from the rim 118 of the container 102 to the shoulder 122 where the neck widens outward to the base portion 114 of the container) is sufficient to accommodate the side wall 152 of the collar in the second configuration, i.e., when the vent assembly is omitted as illustrated in FIG. 12.

Figure 23:
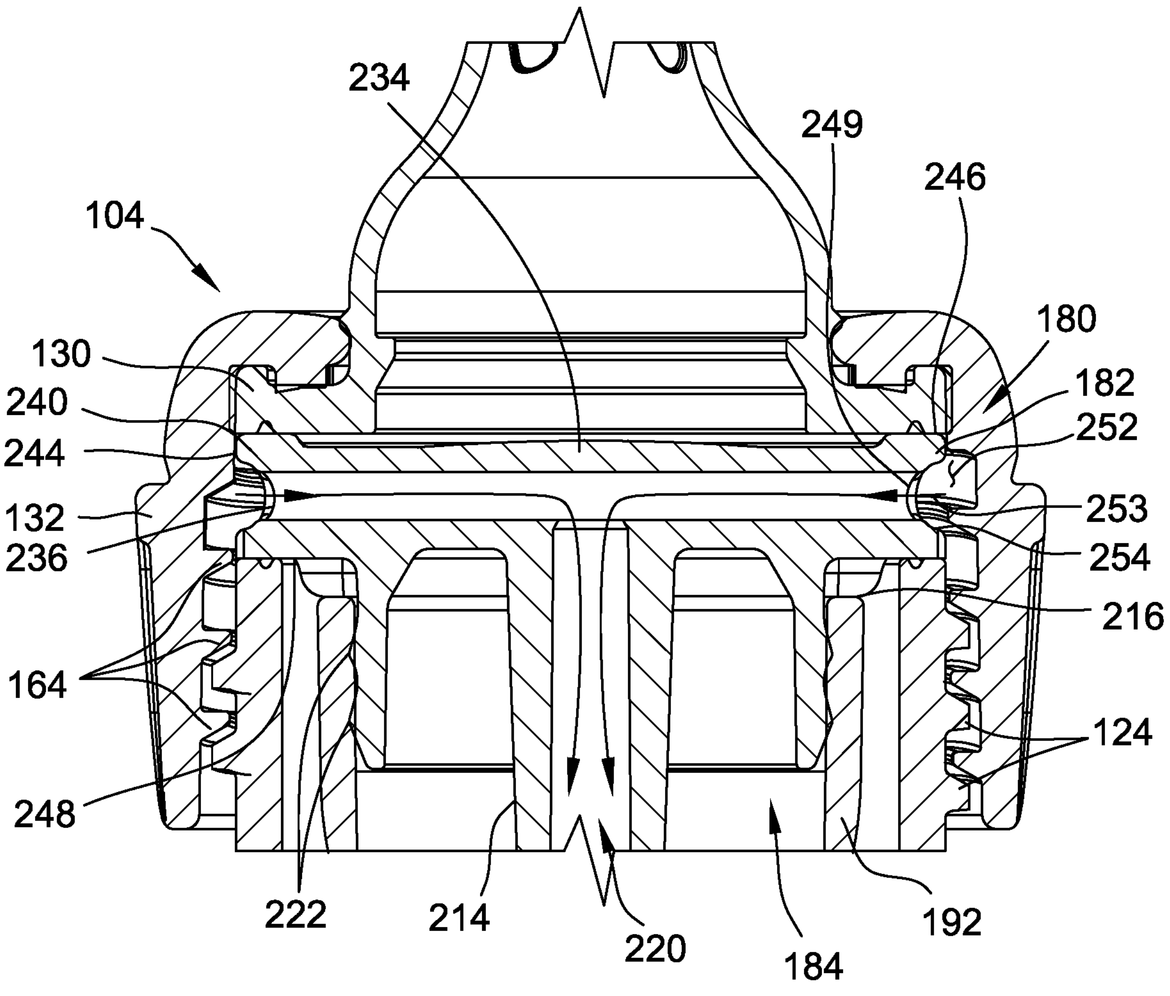
FIG. 23 is a cross-section of a portion of the bottle assembly of FIG. 1 including a collar assembly retaining the vent assembly shown in FIG. 22 on a container of the bottle assembly.

Accordingly, as seen in FIGS. 11 and 23, in the first configuration, where the bottle assembly 100 includes the vent assembly 180, the vent assembly 180 is inserted into the container 102 such that the bottom 248 of the perimeter wall 240 seats down against the rim 118 of the container. After the vent assembly 180 is inserted within the container 102, the collar assembly 104 is attached to the container 102 by threadably engaging the internal collar threads 164 with the external threads 124 of the neck 116 and rotating the collar 132 to twist the collar down onto the container. As the collar 132 is tightened onto the container 102, the bottom face 136 of the nipple 130 is urged against the top 246 of the perimeter wall 240 of the vent assembly 180 to seal the nipple (and hence the collar assembly 104) against the vent assembly. Concurrently, the bottom 248 of the perimeter wall 240 of the vent assembly 180 is urged against the rim 118 of the container 102 to seal the vent assembly against the container.

In this configuration, some of the lower threads 164 of the collar engage the threads 124 of the neck, while the uppermost collar threads oppose the perimeter wall 240 of the vent assembly. As illustrated in FIG. 23, the collar side wall 152 is sufficiently long such that in the first configuration, the lower end of the collar side wall extends below the lowermost threads 124 of the neck 116 so that no external threads are visible when the collar assembly 104 is secured to the container 102. In addition, the annular gap 252 is defined between the perimeter wall of the vent assembly 180 and the internal surface of the collar including the threads 164. Accordingly, air is permitted to flow along the threads 124 of the collar 132 and through the annular gap 252. The airflow is allowed to flow throughout the annular gap 252 and into the passage 220 through the vent openings 249. As a result, the annular gap 252 provides increased space for airflow and is believed to provide smoother airflow into the vent assembly 180.

In the second configuration, illustrated in FIG. 12, the vent assembly 180 is omitted from the bottle assembly 100. When the collar assembly 104 is tightened down onto the container 102 in this configuration, the collar threads 164 engage the threads 124 of the neck 116 of the container and the collar 132 is rotated to twist the collar down onto the container until the nipple 130 is urged against the rim 118 of the container to seal the nipple directly against the container. In this configuration, a lower set of the collar threads is disposed below the lowermost external thread 124 of the neck 116. In this manner, the lower end of the collar 132 is disposed well below the lowermost external thread 124 and nearer to the shoulder 122 of the container. In addition, the nipple 130 is configured to vent the container 102 to the atmosphere in the second configuration with the vent assembly 180 omitted. Specifically, the nipple 130 includes at least one vent feature 256 that allows airflow into the container 102 when the nipple 130 is positioned on the rim 118 of the container 102.

Embodiments of a bottle assembly described herein provide advantages over at least some known bottle assemblies. For example, the described bottle assemblies are simpler and more convenient for a preparer to assemble and may be at least partially assembled when the preparer has limited use of their hands. In addition, the collar assembly and the cap of the bottles assemblies may reduce discomfort during assembly and during use of the bottle assembly because the collar assembly and the cap reduce pressure points on the preparers hand(s) and provide an increased grip for the preparer. In addition, in some embodiments, the bottle assemblies include a vent assembly that provides increased airflow into the container from the atmosphere in comparison to known vented bottles. In addition, the vent assembly may include a double seal that allows for simpler assembly and reduces leakage in comparison to known vent assemblies.

When introducing elements of the present invention or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above without departing from the scope of the invention, it is intended that all matter contained in the above description and shown in the accompanying drawings shall be interpreted as illustrative and not in a limiting sense.

What is claimed is:

1. A bottle assembly comprising:

a container defining a liquid chamber for holding a quantity of liquid, the container having a closed bottom, an open top, and a side wall extending between the closed bottom and the open top, the side wall including a base portion and a neck that is narrowed with respect to the base portion such that the neck has a smaller diameter than the base portion, the neck including an externally threaded portion and a shoulder defined at a transition between the neck and the base portion;

a collar assembly including a collar and a nipple, the collar assembly being adapted for removable attachment to the container, the nipple including a nipple portion with an aperture and a transversely extending flange with a bottom face, the collar including a collar side wall and an opening, the nipple portion of the nipple extending through the opening in the collar, the collar side wall of the collar having an inner surface with internal threads for threaded engagement with the external threaded portion of the neck of the container to releasably secure the collar assembly on the container; and a vent insert configured for selective placement on the open top of the container, the vent insert, when placed on the open top of the container, defines a gap for allowing liquid in the liquid chamber of the container to flow past the vent insert towards the nipple and a vent passage having at least one vent opening in flow communication with the liquid chamber of the container for allowing air to flow into the liquid chamber, the vent insert further defining an annular gap, the annular gap forming a portion of the vent passage, wherein the bottle assembly is selectively operable in two different configurations, a first configuration in which the vent insert is placed on the open top of the container and a second configuration in which the vent insert is omitted, the annular gap defined by the vent insert being disposed above the open top of the container in the first configuration of the bottle assembly.

2. The bottle assembly set forth in claim 1, wherein the annular gap extends circumferentially around at least a portion of the vent insert.

3. The bottle assembly set forth in claim 1, wherein the annular gap is in direct flow communication with the at least one vent opening.

4. The bottle assembly set forth in claim 1, wherein the annular gap is defined between a perimeter wall of the vent insert and the inner surface of the collar side wall.

5. The bottle assembly set forth in claim 4, wherein the perimeter wall is a concaved wall.

6. The bottle assembly set forth in claim 5, wherein air is able to flow along the internal threads of the inner surface of the collar side wall and through the annular gap.

7. The bottle assembly set forth in claim 1, wherein the annular gap facilitates decreases turbulence of air flowing into the liquid chamber of the container.

8. The bottle assembly set forth in claim 1, wherein the nipple of the collar assembly is a vented nipple having a vent opening.

9. The bottle assembly set forth in claim 1, wherein the nipple of the collar assembly can be selectively removed from the collar of the collar assembly.

10. A bottle assembly comprising:

a container defining a liquid chamber for holding a quantity of liquid, the container having a closed bottom, an open top, and a side wall extending between the closed bottom and the open top, the side wall including a base portion and a neck that is narrowed with respect to the base portion such that the neck has a smaller diameter than the base portion, the neck including an externally threaded portion and a shoulder defined at a transition between the neck and the base portion;

a collar assembly including a collar and a nipple, the collar assembly being adapted for removable attachment to the container, the nipple including a nipple portion with an aperture and a transversely extending flange with a bottom face, the collar including a collar side wall and an opening, the nipple portion of the nipple extending through the opening in the collar, the collar side wall of the collar having an inner surface with internal threads for threaded engagement with the external threaded portion of the neck of the container to releasably secure the collar assembly on the container; and a vent insert configured for selective placement on the open top of the container, the vent insert, when placed on the open top of the container, defining a gap for allowing liquid in the liquid chamber to flow past the vent insert towards the nipple and a vent passage having at least one vent opening in flow communication with the liquid chamber of the container for allowing air to flow into the liquid chamber, the vent insert further defining an annular gap, the annular gap forming a portion of the vent passage, wherein the bottle assembly is selectively operable in two different configurations, a first configuration in which the vent insert is placed on the open top of the container and a second configuration in which the vent insert is omitted, the annular gap defined by the vent insert being disposed adjacent the collar assembly and above the open top of the container in the first configuration of the bottle assembly.

11. The bottle assembly set forth in claim 10, wherein the annular gap extends circumferentially around at least a portion of the vent insert.

12. The bottle assembly set forth in claim 10, wherein the annular gap is defined between a perimeter wall of the vent insert and the inner surface of the collar side wall.

13. The bottle assembly set forth in claim 12, wherein the perimeter wall is a concaved wall.

14. The bottle assembly set forth in claim 12, wherein air is able to flow along the internal threads of the inner surface of the collar side wall and through the annular gap.

15. The bottle assembly set forth in claim 10, wherein the annular gap facilitates decreases turbulence of air flowing into the liquid chamber of the container.

16. The bottle assembly set forth in claim 10, wherein the annular gap is formed, at least in part, by a curved surface of the vent insert.

17. The bottle assembly set forth in claim 10, wherein the nipple of the collar assembly can be removed from the collar of the collar assembly.

18. The bottle assembly set forth in claim 10, wherein the nipple of the collar assembly is a vented nipple having a vent opening.

19. A bottle assembly comprising:

a container defining a liquid chamber for holding a quantity of liquid, the container having a closed bottom, an open top, and a side wall extending between the closed bottom and the open top, the side wall including a base portion and a neck, the neck including an externally threaded portion;

a collar assembly including a collar and a nipple, the collar assembly being adapted for removable attachment to the container, the nipple including a nipple portion with an aperture and a transversely extending flange with a bottom face, the collar including a collar side wall and an opening, the nipple portion of the nipple extending through the opening in the collar, the collar side wall of the collar having an inner surface with internal threads for threaded engagement with the external threaded portion of the neck of the container to releasably secure the collar assembly on the container; and a vent insert configured for selective placement on the open top of the container, the vent insert, when placed on the open top of the container, defining a gap for allowing liquid in the liquid chamber to flow past the vent insert towards the nipple and a vent passage having at least one vent opening in flow communication with the liquid chamber of the container for allowing air to flow into the liquid chamber, the vent insert further defining an annular gap, the annular gap forming a portion of the vent passage, wherein air flows along the internal threads of the inner surface of the collar side wall and into the annular gap defined between the vent insert and the collar assembly to flow through the vent passage of the vent insert into the liquid chamber, wherein the bottle assembly is selectively operable in two different configurations, a first configuration in which the vent insert is placed on the open top of the container and a second configuration in which the vent insert is omitted, the annular gap defined by the vent insert being disposed above the open top of the container in the first configuration of the bottle assembly.

20. The bottle assembly set forth in claim 19, wherein the annular gap extends circumferentially around at least a portion of the vent insert.

21. The bottle assembly set forth in claim 19, wherein the nipple of the collar assembly can be removed from the collar of the collar assembly.

22. The bottle assembly set forth in claim 19, wherein the nipple of the collar assembly is a vented nipple having a vent opening.

* * * * *